United States Patent [19]

Fagundes

[11] 4,227,367
[45] Oct. 14, 1980

[54] COTTON HARVESTING APPARATUS

[76] Inventor: John L. Fagundes, 8576 Fargo Ave., Hanford, Calif. 93230

[21] Appl. No.: 11,485

[22] Filed: Feb. 12, 1979

[51] Int. Cl.³ .............................................. A01D 46/08
[52] U.S. Cl. ........................................................ 56/36
[58] Field of Search ....................................... 56/28-49

[56] References Cited

U.S. PATENT DOCUMENTS

| | | | |
|---|---|---|---|
| 2,784,544 | 3/1957 | Rust | 56/28 |
| 3,035,387 | 5/1962 | Berill | 56/28 |
| 3,324,636 | 6/1967 | Honn | 56/28 |

Primary Examiner—Robert A. Hafer
Attorney, Agent, or Firm—Flehr, Hohbach, Test, Albritton & Herbert

[57] ABSTRACT

Cotton harvesting apparatus for harvesting cotton from cotton plants planted in spaced apart generally parallel rows and having a cotton picking apparatus with ground engaging means for movement of the cotton picker over the ground. The cotton picking apparatus includes one or more picker mechanisms which are adapted to pick cotton from the cotton plants as the cotton picking apparatus is moved over the cotton plants. Boom mechanisms are carried by the cotton picker and are used for striking the cotton plants for removing leaves, leaf stems and other trash off of the cotton plants prior to the cotton plants being engaged by a picker mechanism. One of the boom mechanisms extends in front of the cotton picking apparatus whereas another boom mechanism extends to one side of the cotton apparatus and over the rows of cotton which are to be picked. The height of the boom mechanisms can be adjusted so that the cotton plants are struck by the boom mechanisms at predetermined heights.

10 Claims, 5 Drawing Figures

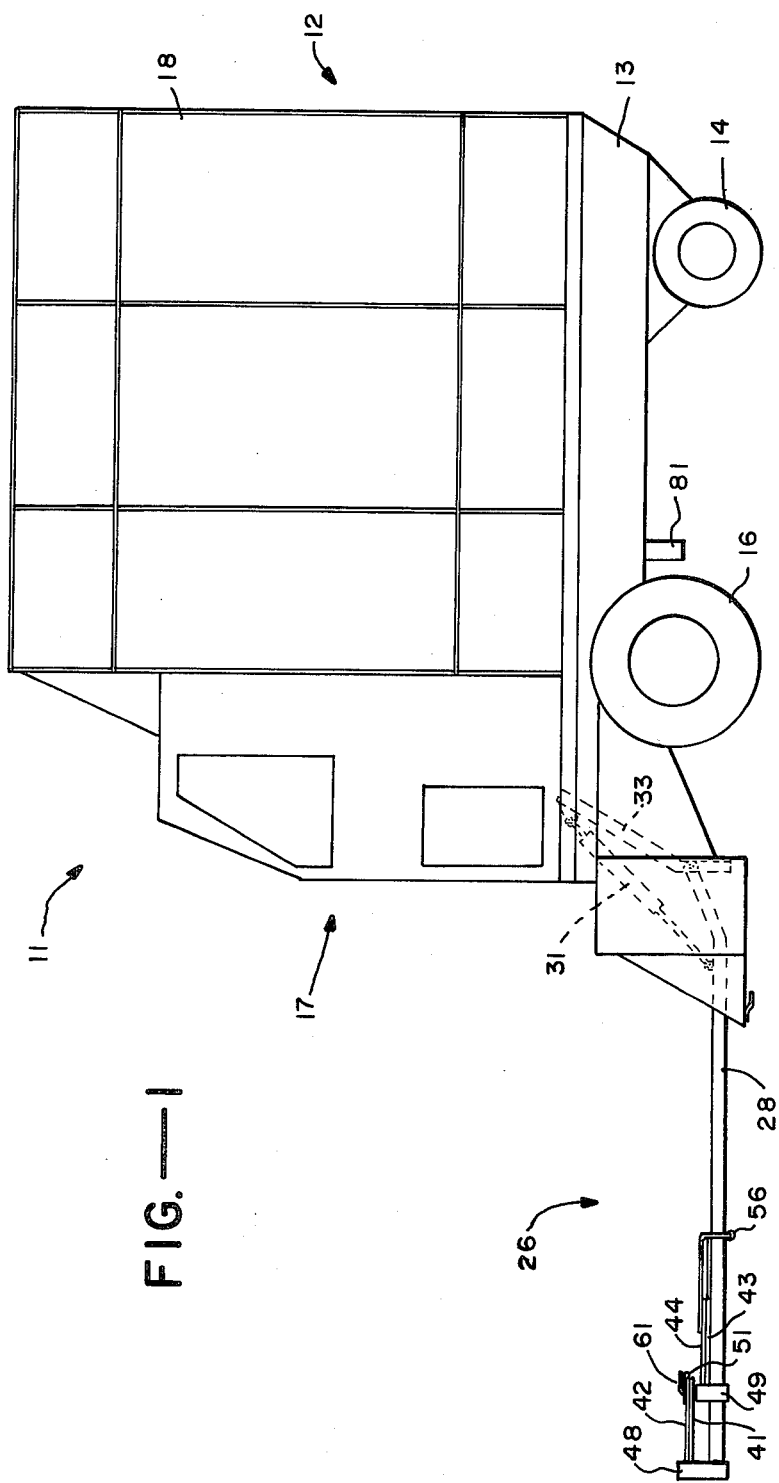

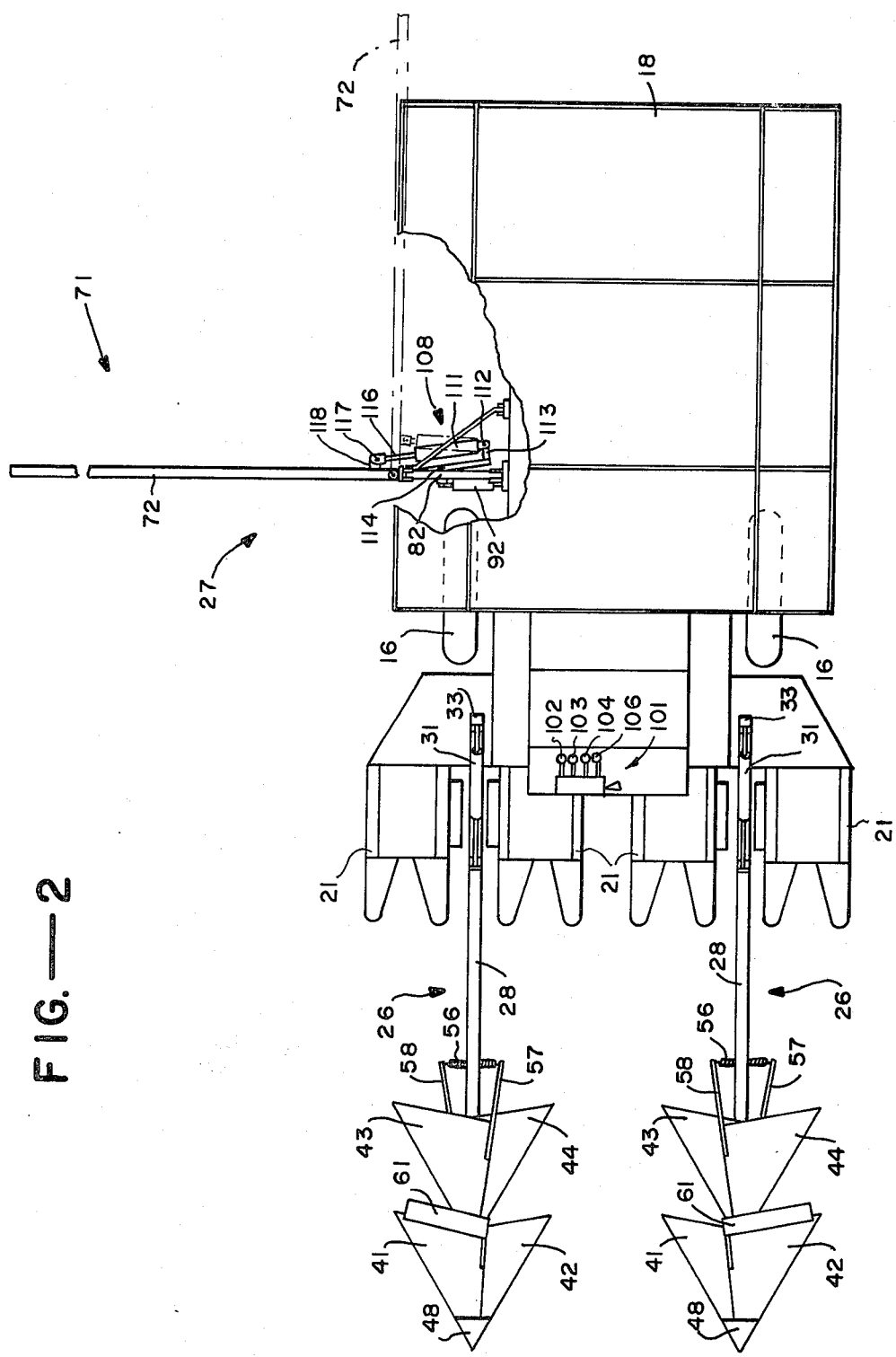
FIG.—2

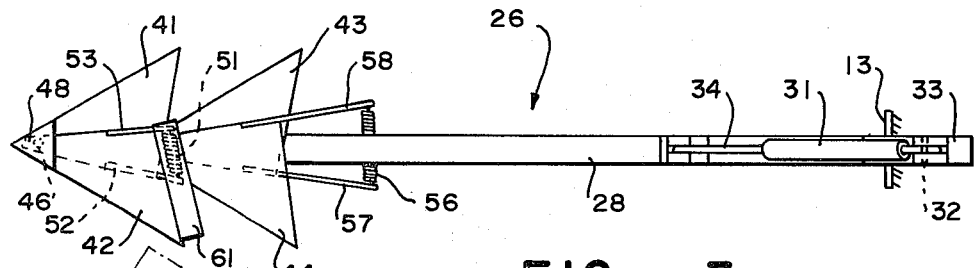
FIG.—3
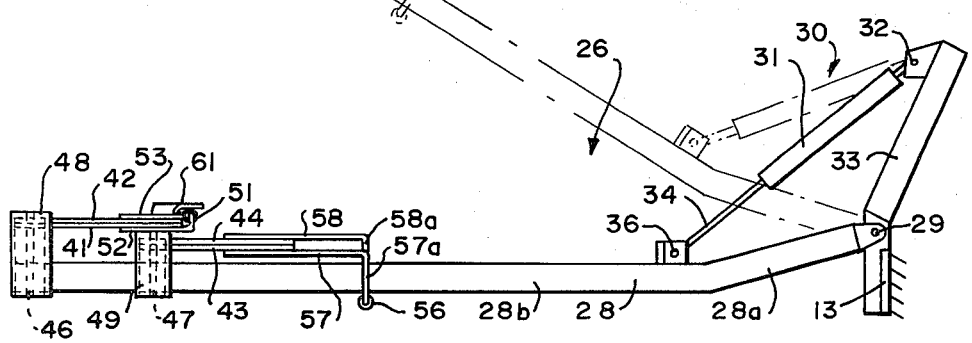
FIG.—4
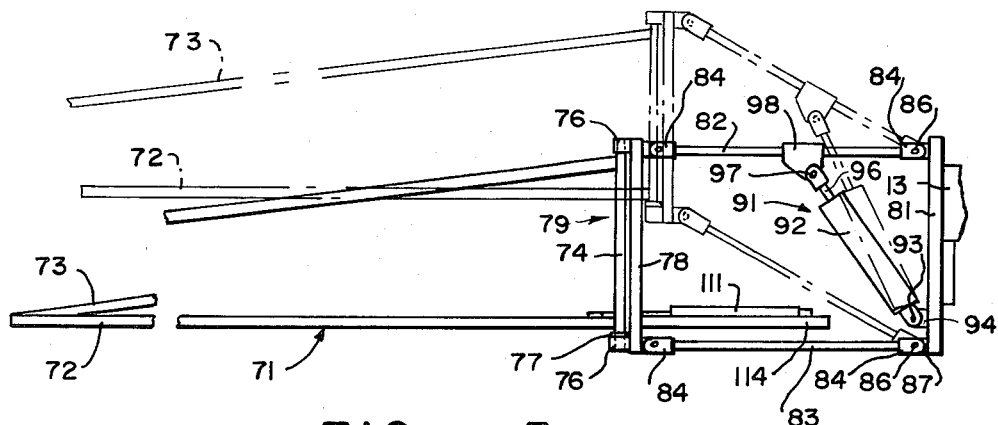
FIG.—5

COTTON HARVESTING APPARATUS

Cotton harvesters have heretofore been provided. However, in connection with such cotton harvesters, difficulty has been encountered in that the cotton harvesters pick up relatively large amounts of cotton plant leaves, leaf stems and other trash from the cotton stalks while the cotton bolls are being picked from the cotton plants. These leaves, leaf stems and other trash from the cotton stalks increase the costs of ginning the cotton and also lower the grades of cotton picked. There is therefore a need for a new and improved cotton picking apparatus which picks up fewer leaves and leaf stems and less trash from the cotton plants during the picking operation.

The cotton harvesting apparatus of the present invention is utilized for harvesting cotton from cotton plants planted in spaced apart generally parallel rows. It includes cotton picking apparatus having ground engaging means for moving the cotton picking apparatus over the ground. The cotton picking apparatus also includes a picking mechanism adapted to pick cotton from the cotton plants as the cotton picking apparatus is moved over the ground. Means is carried by the cotton picking apparatus for engaging the cotton plants substantially prior to the time that they are engaged by the picking mechanism to remove certain of the leaves, leaf stems and other trash from the cotton plants before they enter the cotton picker mechanism so that fewer leaves and stems and less cotton trash are removed from the plants by the picker mechanism at the time the cotton bolls are being picked on the plants. For this purpose, plant engaging elements are carried by booms extending forwardly from the cotton picking apparatus. In addition, a boom extends from the side of the cotton picker and is adapted to engage rows of cotton plants in the rows off to the side as the cotton picking apparatus is advanced.

In general, it is an object of the present invention to provide a cotton harvesting apparatus which minimizes the leaves, leaf stems and other cotton trash which enters the picker mechanism of the harvester as the cotton is being picked from the cotton plants.

Another object of the invention is to provide a cotton harvesting apparatus of the above character in which the leaves, leaf stems and cotton trash are removed from the cotton plants prior to the cotton being picked by the harvester by the use of boom-like attachments.

Another object of the invention is to provide a cotton harvesting apparatus of the above character in which boom-like attachments carry plant engaging means for causing leaf stems, leaves and trash to be shaken off the cotton plants.

Another object of the invention is to provide a cotton harvesting apparatus of the above character in which the booms can be readily moved to out-of-the-way positions to facilitate turning and other movements of the cotton harvesting apparatus.

Additional objects and features of the invention will appear from the following description in which the preferred embodiments are set forth in detail in conjunction with the accompanying drawing.

FIG. 1 is a side elevational view of a cotton harvesting apparatus incorporating the present invention.

FIG. 2 is a top plan view with certain portions broken away of a cotton harvesting apparatus incorporating the present invention.

FIG. 3 is a top plan view of one of the boom-like attachments which extends forwardly of the cotton harvesting apparatus.

FIG. 4 is a side elevational view of the boom attachment shown in FIG. 3 and also shows in dotted lines how it can be moved to an out-of-the-way position.

FIG. 5 is a front elevational view of another boom attachment mounted on the side of the cotton harvester and also shows how it can be adjusted vertically.

The cotton harvesting apparatus 11 consists of a conventional cotton stripper 12. Alternatively it can be a conventional cotton picker. The cotton stripper 12 is provided with a framework 13 which carries rear ground engaging wheels 14 and front ground engaging wheels 16. The front wheels 16 are driven by suitable motive means such as a gasoline or diesel engine (not shown) carried by framework 13 and which is controlled from an operator's cab or station 17 mounted on the front of the framework 13. The cotton harvesting or picking apparatus also includes a large basket 18 for receiving cotton at it is picked. The cotton picking apparatus also includes first and second picker or stripper mechanisms 21 which are mounted on the front of the framework 13 and are generally movable vertically of the framework during the picking operations in a manner well known to those skilled in the art. Thus there is shown a self-propelled cotton stripper 12 which typically carries two pairs of picker mechanisms 21 so that four rows of cotton may be picked at a time.

As shown particularly in FIG. 2, two front boom assemblies 26 are provided on the cotton harvesting apparatus, one for each pair of picker mechanisms. As also shown, there is provided only one side boom assembly 27 which is mounted on the right hand side of the cotton harvesting apparatus 11 looking from the rear to the front of the cotton harvesting apparatus. Each of the front boom assemblies 26 consists of a boom 28 which is formed in two portions 28a and 28b with portion 28a being relatively short in length in comparison to portion 28b and being inclined at a slight angle as for example an angle of approximately 10° with respect to portion 28b. The bottom 28 is pivotally connected to the framework 13 by a pin 29. As can be seen from FIG. 2, the boom 28 is of such a length so that it extends a substantial distance in front of the cotton harvesting apparatus as for example a distance which is approximately one-half the length of the cotton harvesting apparatus as for example fifteen feet.

Means is provided for adjusting the boom 28 so that it can be positioned at a predetermined level with respect to the cotton plants and for moving the same between plant engaging positions and an out-of-the-way position as shown in broken lines in FIG. 4 and consists of a hydraulic actuator assembly 30 in which the cylinder 31 is pivotally connected at point 32 to an upright member 33 secured to the famework 13. The piston rod 34 of the hydraulic actuator 30 is pivotally connected by a pin 36 to the boom 28 at a point which is remote from the pivot point 29. As can be seen from FIG. 4, the hydraulic actuator 30 has a stroke so that it can move the boom to and from a plant engaging position in which it is generally horizontal and an out-of-the-way position in which it is raised to a substantial angle so that the cotton plants are readily cleared to facilitate turning movement of the cotton harvesting apparatus.

Plant engaging means or members are carried by the outer end of the boom. This means consists of a first set of triangularly shaped plates 41 and 42 which are positioned at the forward extremity of the boom 28 and a second set of triangularly shaped plates 43 and 44 which are disposed slightly to the rear of the first set of plates 41 and 42. The plates 41–44 are generally in the form of right triangles. The apexes of the plates 41 and 42 are pivotally mounted on the outer extremity of the boom 28 by a pin 46. Similarly, the plates 43 and 44 have their apexes pivotally mounted on the boom 28 by a pin 47. The plates 41, 42, 43 and 44 are provided with downwardly depending side edges on their outermost side extremities as shown particularly in FIG. 4. The front extremity of the plates 41 and 42 is protected by a triangularly-shaped front cover 48 which is mounted over the front end of the boom 28 and the frontal extremities of the plates 41 and 42. Similarly a triangularly-shaped cover 49 is mounted on the boom 28 over the frontal extremities of the plates 43 and 44. Both covers 48 and 49 secured to the boom by suitable means such as by welding.

Means is provided for yieldably urging the rearward extremities of the plates 41 and 42 sideways or outwardly so that they will engage the plants as hereinafter described. The plates are yieldably urged outwardly into a position so that the outer extremities have a width of approximately forty-five inches. The yieldable means for urging the rearward extremities of the plates 41 and 42 sideways or outwardly consists of a coil spring 51 which has one end attached to the rear extremity of a bar 52 which is secured to one side edge of the triangular plate 41 and the other end of which is secured to the outer extremity of another bar 53 which is secured to the side edge of the plate 42.

Similarly, the plates 43 and 44 are provided with a spring 56 one end of which is secured to a bar 57 that is secured to one side of the triangular plate 43 and the other end of which is secured to a bar 58 that is secured to the triangular plate 44. As can be seen particularly in FIG. 4, the bars 57 and 58 are provided with depending portions 57a and 58a so that the spring 56 extends below the boom 28. The spring 51 provided for the plates 41 and 42 extends above the boom 28. A protective cover 61 overlies the spring 51. With the arrangement thus shown it can be seen that the triangular plates 41 and 42 and 43 and 44 yieldably urged to their most expanded positions by the springs 51 and 56 against the covers 48 and 49 so that they can strike the plants as hereinafter described. Each pair of plates in combination forms a triangular assembly having an apex facing forward which can readily penetrate the plants and separate them into rows. When for example, the inclined edge of one of the plates engages a plant, it will knock or shake the plant and at the same time the plate can be pushed inwardly against the force of the yieldable means provided by the associated spring to cause stretching of the associated spring. A similar but opposite movement can occur if the other plate of the same pair engages a plant on the other side of the boom. As soon as a plate is free of the plant, the associated spring will yieldably urge it back to its outermost position as shown in FIGS. 2 and 3.

The side boom assembly 27 consists of a boom 71 which is comprised of two members 72 and 73. The member 72 extends in a substantially horizontal direction and the member 73 extends upwardly from the exterior end of the boom 71 and provides a support for the member 72. As shown particularly in FIG. 5, the outer extremities of the members 72 and 73 are secured together by suitable means such as welding. The inner ends of the members 72 and 73 are secured by suitable means such as welding to a vertical cylindrical member 74 that has its upper and lower ends rotatably mounted in sleeves 76. A collar 77 is provided on the cylindrical member 74 immediately above the lower sleeve 76 and supports the cylindrical member on the sleeve 76 so that the boom can be swung between plant engaging positions and vertically displaced out-of-the-way positions as hereinafter described. The sleeves 76 are secured by suitable means such as welding to a vertical support member 78. The vertical support member 78 forms one element of a parallelogram assembly 79. The other three elements of the parallelogram assembly 79 include another vertical support member 81 which is generally parallel to the support member 78 and is secured to the framework 13. The other two elements of the parallelogram assembly 79 are provided by members 82 and 83 which have U-shaped members 84 secured to opposite ends of the same and which are pivotally connected by pins 86 extending through ears 87 secured to opposite ends of the generally vertical support members 78 and 81 by suitable means such as welding.

Means is provided for controlling the movement of the parallelogram assembly 79 and consists of a hydraulic actuator 91 which has a cylinder 92 that is pivotally connected by a pin 93 to an ear 94 secured by suitable means such as welding to the lower extremity of the vertical support member 81 immediately above the lowermost ear 87 provided on the support member 81. The piston rod 96 of the hydraulic actuator 79 is pivotally connected by a pin 97 to another ear 98 provided on the member 82 approximately equidistant between the ends of the same.

A hydraulic control assembly 101 of a type well known to those skilled in the art and is provided with the cab 17 so it can be readily reached by the operator of the cotton harvesting apparatus 11. Such a hydraulic control assembly 101 includes a control lever 102 which is provided for controlling the hydraulic actuator 29 for the right hand front boom assembly 26 as viewed from the cab looking forward. A control lever 103 is provided for controlling the hydraulic actuator 91 for raising and lowering the parallelogram assembly 79 between the dotted line position shown in FIG. 5 and the solid line position shown in FIG. 5. Another control lever 104 is provided for controlling a hydraulic actuator for movement of the side boom assembly 27 from the plant engaging position to an out-of-the-way position as hereinafter described. Another control lever 106 is provided for controlling the hydraulic actuator 29 for the left hand front boom assembly 26.

The hydraulic actuator 108 is provided with a hydraulic cylinder 111 which is pivotally connected by a pin 112 to an ear 113. The ear 113 is carried by support bar 114 which is secured to the vertical support member 78 by suitable means such as welding. The piston rod 116 of the hydraulic actuator 108 is pivotally connected by a pin 117 to an ear 118 which is secured to the lower boom member 72 of the boom 71 by suitable means such as welding at a point which is slightly forward of the pivot axis for the boom 71 formed by the cylindrical member 74. The stroke of the piston rod 116 is such so that the boom 71 can be moved from a plant engaging position in which it is at an angle of 90° or at right angles to the longitudinal axis of the cotton harvester framework and at right angles to the normal direction of travel of the cotton harvesting apparatus as shown in solid lines in FIG. 2 to an out-of-the-way position shown in broken lines in FIG. 2 in which it is moved into a position which is adjacent the side of the cotton harvesting apparatus and is parallel to the longitudinal axis of the cotton harvesting apparatus and the normal direction of movement of the cotton harvesting apparatus.

Operation and use of the cotton harvesting apparatus may now be briefly described as follows. When the cotton harvesting apparatus is not harvesting, the side boom assembly 27 is brought in alongside the cotton harvesting apparatus as shown in broken lines in FIG. 2 and the front boom assemblies 26 are moved to the raised positions as shown in broken lines in FIG. 2. These positions of the front boom assemblies 26 and the side boom assemblies 27 permit freedom of movement of the cotton harvesting apparatus and permit travel of the same from field to field and for permitting turning around of the cotton harvesting apparatus at the end of the rows.

As soon as the cotton harvesting apparatus has been aligned with the rows which are to be harvested, the front boom assemblies 26 are lowered so that they extend between the four rows which are to be picked with one of the front boom assemblies 26 being disposed between each of two rows. The side boom assembly 27 is extended so that it extends at right angles to the direction of travel for the cotton picker and so that it will overlie the next four rows which are to be picked. The operator of the cotton harvesting apparatus determines the height at which the front boom assemblies 26 and the side boom assembly 27 travel by adjustment of the control levers 102, 103, 104 and 106. Generally, the front boom assemblies 26 are adjusted so that they will strike the cotton plants, that is the main vertical stalks thereof at a point ranging from five to ten inches above the ground level. Similarly, the side boom assembly 27 is adjusted to a height so that it will strike the cotton plants at a certain distance above the ground as for example five to ten inches above the ground.

As the cotton harvesting apparatus is advanced, the front boom assembly 26 will advance through the plants and bump the cotton plants. The plates 41, 42, 43 and 44 will engage the stalks and strike the same to cause many of the remaining leaves, small stalk fragments and the like to fall to the ground before the plants are reached by the picker mechanisms carried by the cotton harvesting apparatus.

It should be appreciated that before the picking is commenced, a defoliant has been placed upon the cotton plants so that many of the leaves have already fallen from the plant or in other geographical areas where there are heavy frosts that frosts will have killed the plants and many of the leaves also will have fallen to the ground.

Since the plates 41, 42, 43 and 44 are pivotally mounted as hereinbefore described and are yieldably urged to their outermost positions, as the cotton harvesting apparatus is advanced, the outer extremities of the plates can be moved inwardly against the force of the springs 51 and 56 to permit the front boom assemblies 26 to advance through the plants. As soon as the plates have cleared the plant, the will again spring outwardly under the force of the springs so they are ready to engage the next plant or plants in the rows. It will be noted that in each of the front boom assemblies 26 two pairs of plates have been provided so that each stalk of the cotton plant will be engaged at least twice. It should be appreciated that if desired, additional pairs of plates can be provided on the boom so that the plants can be engaged more than twice before entering the picker mechanism or if only one pair of plates is necessary that one of the pair of plates can be removed.

At the same time that the front boom assemblies 26 are performing their functions on the cotton plants, the side boom assembly will be engaging the plants along side of the cotton picker in the rows which will be picked by the cotton harvesting apparatus during its next pass through the field. The side boom assembly 27 will brush over the top of the plants and bend them over and then as soon as they clear the plants, the plants will spring back and will cause many of the remaining leaves and stem fragments to fall off of the plants. During the next pass through the field when the plants are being picked, the front boom assemblies 26 will again engage the plants to cause further knocking of the plants whereby additional leaf and stem fragments will fall to the ground.

It has been found that the use of the front boom assemblies and the side boom assemblies has been very efficacious in substantially reducing the amount of leaves and trash which are picked with the cotton bolls and thereby substantially improving the grade of cotton which is delivered to the cotton gin.

It should be appreciated that if desired, the cotton harvesting apparatus can be utilized with only a side boom assembly eliminating the use of a front boom assembly or conversely the front boom assembly can be utilized without the side boom assembly However, it has been found that it is advantageous on many occasions to utilize both the side boom assembly and the front boom assemblies. It should also be appreciated in the event that only a two row cotton harvesting apparatus is utilized, that it only be necessary to provide a single front boom assembly 26 along with the single side boom assembly 27. As hereinbefore described, the parallelogram assembly has been provided in conjunction with the side boom assembly to ensure that the side boom 71 is maintained substantially horizontal regardless of the height at which the side boom 71 is positioned. It has not been found to be necessary to utilize such a parallelogram mechanism on the front boom assembly since the major functioning portion of the front boom assembly is disposed at the forward extremity of the front boom assembly. However, it should be appreciated that if desired, a parallelogram assembly also can be provided on each of the front boom assemblies to ensure that the front boom is also maintained substantially parallel regardless of its elevational position.

What is claimed is:

1. In a cotton harvesting apparatus for harvesting cotton from cotton plants planted in spaced generally parallel rows, a wheeled framework having ground engaging means for permitting movement over the ground, a cotton picking mechanism carried by the wheeled framework and adapted to engage the cotton plants to remove the cotton therefrom, and at least one boom mechanism carried by the framework and adapted to engage the cotton plants before they are engaged by the cotton picker mechanism to shake the plants to cause leaf and steam fragments to fall therefrom and means for moving said boom mechanism between the plant engaging position and an out-of-the-way position.

2. An apparatus as in claim 1 together with means for adjusting the height of the boom mechanism so that the height at which the cotton plants are struck by the boom mechanism can be adjusted.

3. A cotton harvesting apparatus as in claim 1 wherein said boom mechanism includes a side boom assembly, said side boom assembly comprising a boom, means for mounting said boom for movement between a position which is substantially at right angles to the direction of travel of the cotton harvesting apparatus and a position alongside the wheeled framework substantially in line with the direction of travel of the cotton harvesting apparatus.

4. A cotton harvesting apparatus as in claim 3 together with means for vertically adjusting the position of said boom to thereby adjust the position of the boom with respect to the ground to thereby adjust the position at which the boom strikes the plants.

5. Apparatus as in claim 4 wherein said means for vertically adjusting the position of said boom includes a parallelogram assembly so that said boom can be maintained in a substantially horizontal position regardless of its vertical elevation.

6. Apparatus as in claim 3 together with means carried by the framework and secured to the boom for moving said boom from its position at substantially right angles to the direction of travel to the wheeled framework to a position which is substantially in line with the direction of travel of the wheeled framework.

7. Apparatus as in claim 1 wherein said boom mechanism includes at least one front boom assembly, said front boom assembly comprising a boom, means for raising and lowering the outer extremity of the boom, plant engaging members carried by the outer extremity of the boom and means carried by the boom for yieldably urging said plant engaging members to outermost positions whereby they are adapted to engage the plants said yieldable means permitting the plant engaging members to be moved inwardly against the force of the yieldable means to permit the plant engaging members to pass by the plants after the plants are engaged by the plant engaging members.

8. Apparatus as in claim 7 wherein said plant engaging members include a first pair of triangularly shaped plant engaging members pivotally mounted on said boom for swinging movement with respect to said boom and wherein said yieldable means urges the plant engaging members to spaced apart positions.

9. Apparatus as in claim 8 wherein two pairs of plant engaging members are provided on each boom with one pair being disposed forwardly of the other pair.

10. Apparatus as in claim 1 wherein said at least one boom mechanism includes a side boom assembly mounted on one side of said framework for engaging the plants alongside of the cotton harvesting apparatus which are to be picked during the next pass through the field and a front boom assembly mounted on the front of the framework for engaging the cotton plants immediately prior to the time that they are engaged by the picker mechanism.

* * * * *